April 14, 1959    J. A. FAY    2,882,366
DISHWASHER WITH FLOAT SWITCH
Filed Dec. 3, 1956
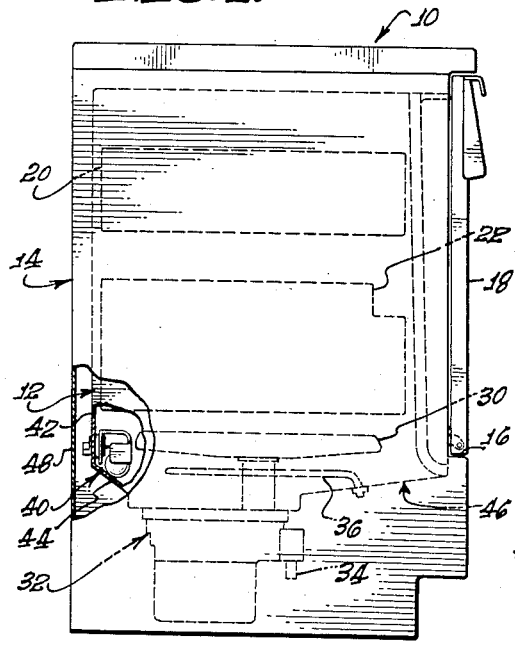
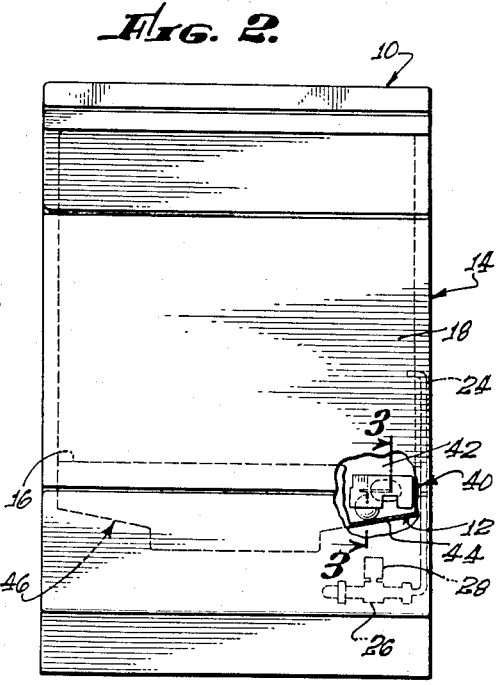
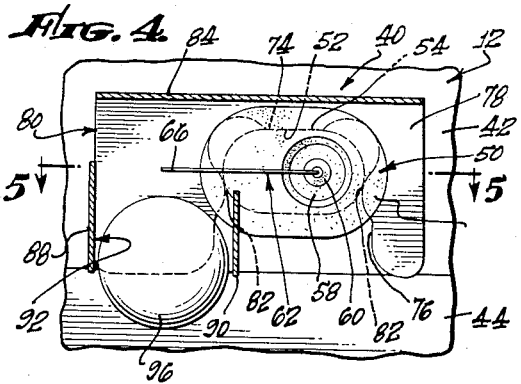
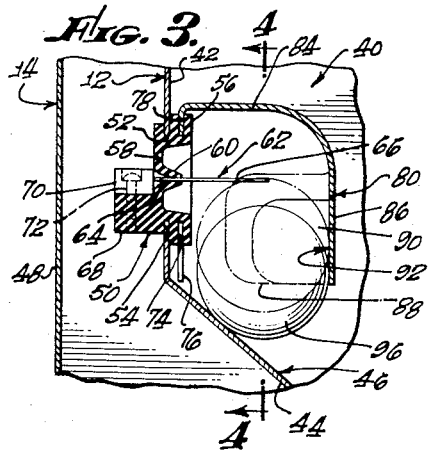
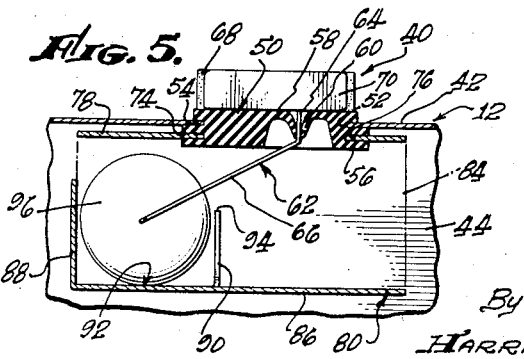
John A. Fay,
INVENTOR.
By His Attorneys.
Harris, Kiech, Foster & Harris

United States Patent Office

2,882,366
Patented Apr. 14, 1959

2,882,366

DISHWASHER WITH FLOAT SWITCH

John A. Fay, North Hollywood, Calif., assignor to Waste King Corporation, Los Angeles, Calif., a corporation of California Application December 3, 1956, Serial No. 625,687

5 Claims. (Cl. 200—84)

The present invention relates to floats and, more particularly, to a float assembly for use in connection with a fluid receptacle, such as the washing vat or tub of an automatic dishwasher, to respond to variations in the level of a fluid therein. Still more particularly, the present invention relates to a float switch assembly for limiting filling of such fluid receptacle so as to prevent overflowing thereof.

While it will be apparent from the foregoing that the float assembly of the invention is susceptible of utility in other environments, it has particular utility in a float switch assembly for limiting filling of the washing vat or tub of an automatic dishwasher and will be specifically disclosed herein in such an environment, the float assembly having various novel relationships with the tub in this environment as will become apparent.

A primary object of the invention is to provide a float assembly which includes a float cage, a free float loosely confined in the cage, and an arm or lever, such as a switch arm, extending through a side wall of the float cage into the cage for engagement by the free float therein. With this construction, as the liquid level in the cage varies, the free float moves into or out of engagement with the arm extending into the cage through the side wall thereof to cause movement of the arm to actuate a device, such as a switch, outside the cage.

With the foregoing construction, the free float actuates the device to which the arm is connected without any direct connection between the arm and the float, actuation of the device being achieved merely upon engagement of the float with, or disengagement of the float from, the arm. One advantage of this construction is that the float is free to rotate or spin in all directions in operation so that the resulting rubbing engagement between the float and the side walls of the cage prevents accumulations of foreign matter on both the float and the cage walls, this self-cleaning action being an important feature of the invention.

Another object of the invention is to provide a float switch assembly wherein the arm or lever extending into the cage for engagement by the free float is connected to a switch for controlling the fluid level in a vat or tub with which the assembly is used.

An important object of the invention is to provide a float switch assembly wherein the arm extends into the float cage through a diaphragm-like partition which provides a fluid-tight seal around the arm, this partition thus providing a fluid-tight barrier between the cage on one side thereof and the switch on the opposite side thereof.

Another object is to provide a float switch assembly of the foregoing nature wherein the arm includes a rotatable shaft portion extending through the diaphragm-like side wall, and an angularly offset portion extending into the cage for engagement by the free float therein. With this construction, the movement of the arm relative to the diaphragm-like partition is of a rotary nature, the partition, which is preferably formed of an elastomeric material, thus providing a fluid-tight seal around the rotatable shaft portion of the arm.

Another object of the invention is to provide a float switch assembly which includes an elastomeric support providing the aforementioned diaphragm-like partition, a cage member defining the float cage being mounted on this elastomeric support on one side of the partition and the switch to which the arm is connected being mounted on such support on the opposite side of the partition.

A further object is to provide an assembly wherein the cage member is provided with an opening therein edges of which are disposed in a groove in the elastomeric support to mount the cage member on the support.

Another object is to provide an elastomeric support having therein a groove which is adapted to receive edges of an opening in a tub wall, or the like, on which the support is to be mounted, the elastomeric support being deformable to permit insertion thereof into the opening with edges of the opening disposed in said groove, and to permit removal thereof from the opening.

Another object is to provide a float switch assembly of the foregoing nature for limiting the filling of the tub or vat of an automatic dishwasher to prevent overflowing thereof, the switch of the assembly being connected to a solenoid-operated fill valve, or the like, to close this valve when the desired water level in the tub is attained.

A further object of the invention is to provide a dishwasher, or other apparatus, which includes a tub provided with a doorway and provided with a wall having an opening therein spaced from the doorway, the elastomeric support carrying the switch and float cage being removably set in such opening and accessible through the doorway of the tub for removal from the opening. With this construction, the float switch assembly of the invention may be removed from the dishwasher for service or repair from the doorway of the tub, without any necessity for removing any exterior panels, or the like, of a housing enclosing the tub. Thus, mounting the float switch assembly in an opening in the tub in such a manner that it is installable and removable through the doorway of the tub greatly facilitates service and repair of the assembly, which is an important feature of the invention.

The foregoing objects, advantages, features and results of the present invention, together with various other objects, advantages, features and results thereof which will be apparent to those skilled in the art in the light of this disclosure, may be attained with the exemplary embodiment of the invention illustrated in the accompanying drawing and described in detail hereinafter. Referring to the drawing:

Fig. 1 is a side elevational view of an automatic dishwasher with parts of the exterior housing and the washing vat or tub of the dishwasher broken away to illustrate the location of the float switch assembly of the invention therein;

Fig. 2 is a front elevational view of the dishwasher with parts broken away for the same purpose as in Fig. 1;

Fig. 3 is an enlarged, fragmentary sectional view taken along the arrowed line 3—3 of Fig. 2 and illustrating the float switch assembly of the invention;

Fig. 4 is a fragmentary sectional view taken along the arrowed line 4—4 of Fig. 3; and Fig. 5 is a fragmentary sectional view taken along the arrowed line 5—5 of Fig. 4 of the drawing.

The numeral 10 designates an automatic dishwasher which includes a washing vat or tub 12 within an outer housing or cabinet 14. The tub 12 and the cabinet 14 are provided with a common doorway 16 which is located at the front of the dishwasher in the particular construction illustrated and which is closed by a door 18. In normal operation of the dishwasher 10, the dishes to be washed are placed in dish racks 20 and 22 which are accessible through the doorway 16. Water for washing the dishes in the dish racks 20 and 22 is introduced into the tub 12 through an inlet or filling means diagrammatically shown as comprising an inlet or fill tube 24, the introduction of water through the fill tube being controlled by a fill valve 26 operated by a solenoid 28. Preferably, energization of the solenoid 28 results in opening of the fill valve 26, while deenergization of the solenoid results in closing thereof. The water introduced into the tub 12 in the foregoing manner, to which a suitable detergent, or other washing compound, may be added in any suitable manner, is sprayed over the dishes in the dish racks 20 and 22 by a spinner 30 to which the water in the tub is delivered by a motor and pump unit 32, this unit being provided with an outlet 34 through which the water in the tub may be discharged upon completion of the washing operation. The water discharged by the motor and pump unit 32 may be diverted either to the spinner 30, or to the outlet 34, under the control of any suitable means, not shown. The tub 12 also contains, below the spinner 30, an immersion type electric heating element for heating the water in the tub at various times during the operating cycle of the dishwasher 10.

It will be understood that the over-all operating cycle of the dishwasher 10 may include several phases, such as an initial rinsing phase, a washing phase utilizing a suitable detergent, or other washing compound, and one or more final rinsing phases, the exact number of such phases and their sequence forming no part of the present invention. In each such phase, water is introduced into the tub 12 in the manner hereinbefore described and is then sprayed over the dishes in the dish racks 20 and 22 by the spinner 30 in the manner described, the water being discharged through the outlet 34 at the end of each phase. The various phases of the over-all operating cycle may be initiated and terminated at the proper time in the cycle by a suitable timer, not shown, as is well known in the art, such timer energizing and deenergizing the various components of the dishwasher at predetermined times during the cycle to provide a completely automatic cycle.

The present invention provides a float switch assembly, designated generally by the numeral 40, for limiting the water level in the tub 12 so as to prevent overflowing of the tub through the doorway 16. This may be accomplished by connecting the float switch assembly 40 in circuit with the solenoid 28 in such a manner, not specifically shown, as to deenergize this solenoid to permit closure of the fill valve 26 when the desired maximum water level in the tub is reached, even though the timer, which originally energized the solenoid 28 to open the fill valve 26, may not yet have deenergized this solenoid. Thus, the float switch assembly 40 provides an automatic control of the maximum water level which is independent of any timer which may be used.

Considering the invention now in more detail, the float switch assembly 40 is mounted on a sidewall, i.e., the rear wall 42 of the tub 12 adjacent a portion 44 of the bottom wall 46 which slopes downwardly from the rear wall 42 toward the motor and pump unit 32. The location of the float switch assembly 40 on the rear wall 42 of the tub 12 is accessible from the interior of the tub through the doorway 16 so that the assembly 40 may be installed and removed through this doorway, in a manner to be described, which is an important feature of the invention since it permits installation and removal of the float switch assembly without removing the rear wall or panel 48 of the cabinet 14.

The float switch assembly 40 includes an elastomeric support 50 which is set in and acts as a stopper for an opening 52 in the rear wall 42 of the tub 12 adjacent the sloping wall portion 44, the elastomeric support 50 being deformable so that it may be installed in and removed from the opening 52 from the interior of the tub through the doorway 16. More particularly, the elastomeric support 50 is provided with an annular groove 54 therein which receives the edges of the opening 52 to mount the assembly 40 on the rear wall 42 of the tub 12, the deformability of the elastomeric support permitting ready insertion thereof into and removal thereof from the opening.

The elastomeric support 50 completely closes and seals the opening 52 in the rear wall 42 of the tub 12, the groove 54 being formed in an annular rim 56 which makes fluid-tight engagement with the wall 42 around the opening. The annular rim 56 encompasses a flexible, diaphragm-like web or membrane 58, hereinafter referred to as a partition, which separates the interior and exterior of the tub 12. The partition 58 is provided with a hollow, frusto-conical, central projection 60 through which extends an arm or lever 62. This arm is provided with a shaft portion 64 which is rotatable about its own axis and the axis of which coincides with the axis of the frusto-conical projection 60, the apex of the latter having fluid-tight engagement with the shaft portion of the arm 62. Thus, the arm 62 may rotate about the axis of the shaft portion 64 thereof without any fluid leakage between the interior and the exterior of the tub 12 by virtue of the fluid-tight seal between the apex of the frusto-conical projection 60 and the shaft portion 64 of the arm. This portion of the arm terminates in an angularly offset arm portion 66 which projects into the tub 12 for a purpose to be described and which makes an obtuse angle with the shaft portion 64.

The elastomeric support 50 is provided externally of the tub 12 with a relatively thick boss or flange 68 on which a conventional switch 70 is mounted, the switch being attached by one or more screws 72, for example. This switch is connected to the outer end of the shaft portion 64 of the arm 62 so that upward and downward movement of the angularly offset portion 66 of the arm results in rotation of the shaft portion 64 thereof to actuate the switch. Preferably, the switch 70 is of the type which is opened in response to rotation of the shaft portion 64 resulting from upward movement of the angularly offset portion 66. Consequently, with the switch 70 connected in series with the solenoid 28 of the fill valve 26, upward movement of the angularly offset portion 66 of the arm 62 results in opening of the switch to deenergize the solenoid and close the fill valve, even though a timer-operated switch, not shown, in series with the switch 70 and the solenoid 28 is still closed. Preferably, the switch 70 is biased toward its closed position so that the angularly offset portion 66 of the arm 62 is biased downwardly, the switch 70 thus being of the normally closed type and being opened in response to upward movement of the angularly offset arm portion 66.

The annular rim 56 of the elastomeric support 50 is provided adjacent the groove 54 with a groove 74 which receives therein edges of an opening 76, e.g., a notch, in a side wall 78 of a cage member 80. As best shown in Fig. 4 of the drawing, the edge of the notch 76 is defined by two inwardly extending projections 82 which face each other and the spacing between which is less than the normal spacing of the corresponding portions of the bottom wall of the groove 74. Thus, when the side wall 78 of the cage member 80 is forced over the elastomeric support 50 with the projections 82 in the grove 74, the material of the support is deformed somewhat as the projections 82 move past the maximum spacing of the corresponding portions of the bottom wall of the groove 74, the material of the support thereafter resuming its original configuration to lock the projections 82 in the groove 74 in a manner which will be apparent from Fig. 4 of the drawing. However, the cage member may readily be removed by reversing the foregoing process.

It will be apparent that the partition 58 of the elastomeric support 50 thus occupies at least a portion of the notch 76 in the side wall 78 of the cage member 80, and therefore becomes, in effect, a portion of this side wall. The cage member 80 is provided with a top wall 84 which extends inwardly from the side wall 78 relative to the tub 12, the top wall having formed integrally therewith a front side wall 86. Extending rearwardly from this front side wall are two spaced tabs 88 and 90 which cooperate with a portion of the rear wall defined by the side wall 78 and the partition 58, a portion of the top wall 84 and a portion of the front side wall 86 to provide a float cage 92.

The angularly offset portion 66 of the switch arm 62 projects from the apex of the frusto-conical protuberance 60 on the diaphragm-like partition 58 into the float cage 92 proper through a gap 94 between the tab 90 and the partition. Within the float cage 92 and engageable with the switch arm 62 to actuate the switch 70 is a free float 96, preferably in the form of a ball adapted to spin or rotate freely in the cage for self-cleaning of both the float and the cage walls with which the float comes into contact. It will be noted that the free float 96 is loosely confined horizontally by the tabs 88 and 90 and by portions of the front wall 86 of the cage member 80 and the rear side wall defined by the wall 78 and the partition 58. Upward movement of the free float 96 within the cage 92 is limited by a portion of the top wall 84 of the cage member 80, while downward movement thereof is limited by a portion of the sloping section 44 of the bottom wall 46 of the tub 12, the float switch assembly 40 being positioned with the cage member 80 in close proximity to the sloping wall section 44 for this purpose.

Considering the operation of the float switch assembly, as long as the water level in the tub 12 is below the predetermined maximum, the free float 96 occupies the position shown in solid lines in Fig. 3 of the drawing. However, as the water level in the tub approaches the desired maximum, the free float 96 moves upwardly into engagement with the angularly offset portion 66 of the switch arm 62, as shown in broken lines in Fig. 3 of the drawing. Such engagement of the free float with the offset portion of the switch arm 62 results in upward movement of this portion of the switch arm to rotate the shaft portion 64 of the switch arm about its axis, thereby actuating the switch 70 to open it. Consequently, when the desired water level in the tub 12 is reached, the resulting opening of the switch 70 causes deenergization of the solenoid 28 controlling the fill valve 26 to permit closure of this valve to determine the introduction of water into the tub 12 through the inlet or fill tube 24. When the water in the tub 12 is subsequently discharged through the outlet 34, the free float 96 descends in the cage 92 into the position shown in solid lines in Fig. 3 of the drawing, thereby permitting the switch 70 to close in readiness for refilling of the tub for the next phase of the operating cycle under the control of the timer, not shown.

As will be apparent, the float switch assembly 40 is readily accessible from the interior of the tub 12 through the doorway 16, access to this assembly being had simply by removing the lower dish rack 22. The float switch assembly 40 may be removed from the opening 52 in the rear wall 42 of the tub 12 by deforming the elastomeric support 50 sufficiently to permit disengaging the groove 54 from the edges of the opening, whereupon the entire assembly 40 may be pulled into the tub 12. At this time, the necessary electrical leads, not shown, connected to the switch 70 may be disconnected therefrom so that the assembly 40 may be removed from the tub 12 through the doorway 16. In order to install the assembly 40, the foregoing procedure is merely reversed. In other words, the switch 70 is first connected to the electrical leads mentioned, these preferably being long enough to permit them to be drawn into the tub 12 through the opening 52. Thereafter, the elastomeric support 50 is deformed sufficiently to snap it into the opening 52 so that the edges of this opening are disposed in the groove 54 to secure the assembly 40 to the wall 42 of the tub 12.

As will be apparent, the cage member 80 may be installed on and removed from the elastomeric support 50 very readily in a similar manner.

Thus, the present invention permits installation of and removal of the float switch assembly 40 from the interior of the tub 12 through the doorway 16 so that it is unnecessary to remove the rear wall 48 of the cabinet 14 to provide access to the assembly 40 for service or repair. The importance of this feature will be appreciated when it is recognized that the dishwasher 10 will normally be installed with the rear wall 48 of the cabinet 14 up against a wall of a kitchen, or other room, so that it is impossible to gain access to the rear wall of the cabinet without moving the dishwasher away from such kitchen wall. Similarly, in installations wherein the dishwasher 10 is built into a kitchen cabinet, the present invention permits removal of the float assembly 40 for service or repair without removing the entire dishwasher from such kitchen cabinet.

Although I have disclosed an exemplary embodiment of my invention herein for purposes of illustration, it will be understood that various changes, modifications and substitutions may be incorporated in such embodiment without departing from the spirit of the invention as defined by the claims hereinafter appearing.

I claim as my invention:

1. In a device of the character dsecribed, the combination of: a float cage having upper and lower ends and a side wall which includes a flexible, elastomeric, diaphragm-like partition; an arm extending through said partition into said cage, said partition encompassing said arm and being in sealing engagement therewith; and a free float loosely confined in said cage and engageable with said arm.

2. In a float switch assembly, the combination of: a float cage having upper and lower ends and a side wall which includes a flexible, elastomeric, diaphragm-like partition; a switch located externally of said cage and having an arm extending through said partition into said cage, said partition encompassing said arm and being in sealing engagement therewith; and a free float loosely confined in said cage and engageable with said arm to actuate said switch.

3. In a device of the character described, the combination of: an elastomeric support including an integral partition and provided with a groove therein; a cage member on one side of said partition and provided with an opening the edges of which are disposed in said groove to mount said cage member on said support, said cage member providing a float cage; an arm extending through said partition into said cage, said partition encompassing said arm and being in sealing engagement therewith; and a free float loosely confined in said cage and engageable with said arm.

4. In a float switch assembly, the combination of: an elastomeric support provided with a groove therein to receive edges of an opening in a wall on which said support is to be mounted, said support including an integral partition; a switch mounted on said support on one side of said partition; an arm connected to said switch and extending through said partition, said partition encompassing said arm and being in sealing engagement therewith; a float cage mounted on said support on the opposite side of said partition, said arm extending into said cage; and a free float loosely confined in said cage and engageable with said arm to actuate said switch.

5. In a washing apparatus, the combination of: a tub adapted to contain a liquid for washing articles and provided with a doorway, said tub having a wall provided with an opening therein spaced from said doorway; an elastomeric stopper inserted into said opening from within said tub and closing said opening; a switch mounted on said stopper externally of said tub and having an arm extending through said stopper into said tub, said stopper encompassing said arm and being in sealing engagement therewith; and float means within said tub for moving said arm in response to a change in liquid level within said tub.

References Cited in the file of this patent

UNITED STATES PATENTS

| | | |
|---|---|---|
| 515,827 | Hatch | Mar. 6, 1894 |
| 566,612 | O'Connor et al. | Aug. 25, 1896 |
| 1,118,075 | Toohey | Nov. 24, 1914 |
| 1,304,936 | Boardman | May 27, 1919 |
| 2,203,766 | Baer et al. | June 11, 1940 |
| 2,666,109 | Cookson | Jan. 12, 1954 |

FOREIGN PATENTS

| | | |
|---|---|---|
| 271,917 | Germany | May 8, 1913 |

UNITED STATES PATENT OFFICE

CERTIFICATE OF CORRECTION

Patent No. 2,882,366                                                        April 14, 1959

John A. Fay

It is hereby certified that error appears in the printed specification of the above numbered patent requiring correction and that the said Letters Patent should read as corrected below.

Column 5, lines 51 and 52, for "determine" read -- terminate --; column 6, line 24, after "float" insert -- switch --.

Signed and sealed this 18th day of August 1959.

(SEAL)

Attest:

KARL H. AXLINE
Attesting Officer

ROBERT C. WATS
Commissioner of Pate